Dec. 22, 1936. E. J. W. NIELSEN 2,065,015
PLOW
Filed June 27, 1934 4 Sheets-Sheet 3
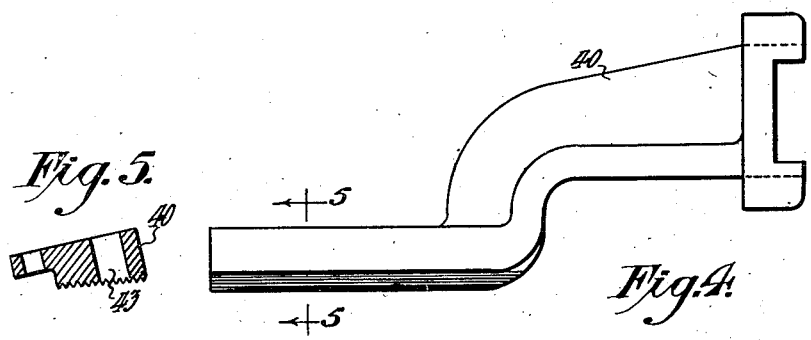
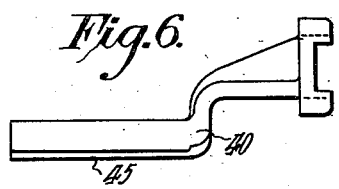
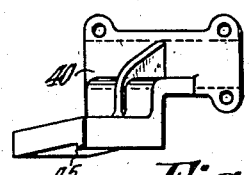
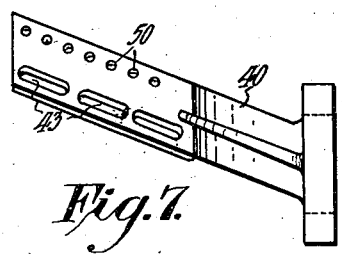
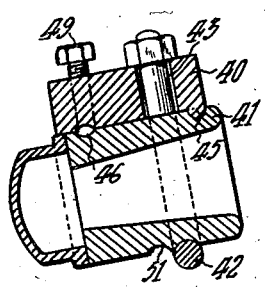
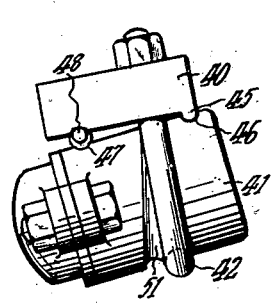
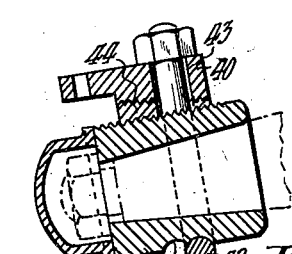
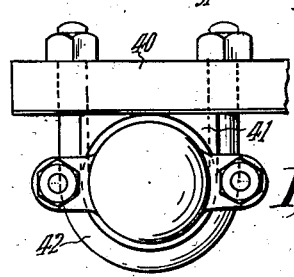
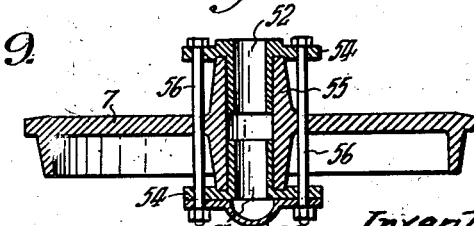
Inventor
E. J. W. Nielsen
by Jno. Muiriee Atty.

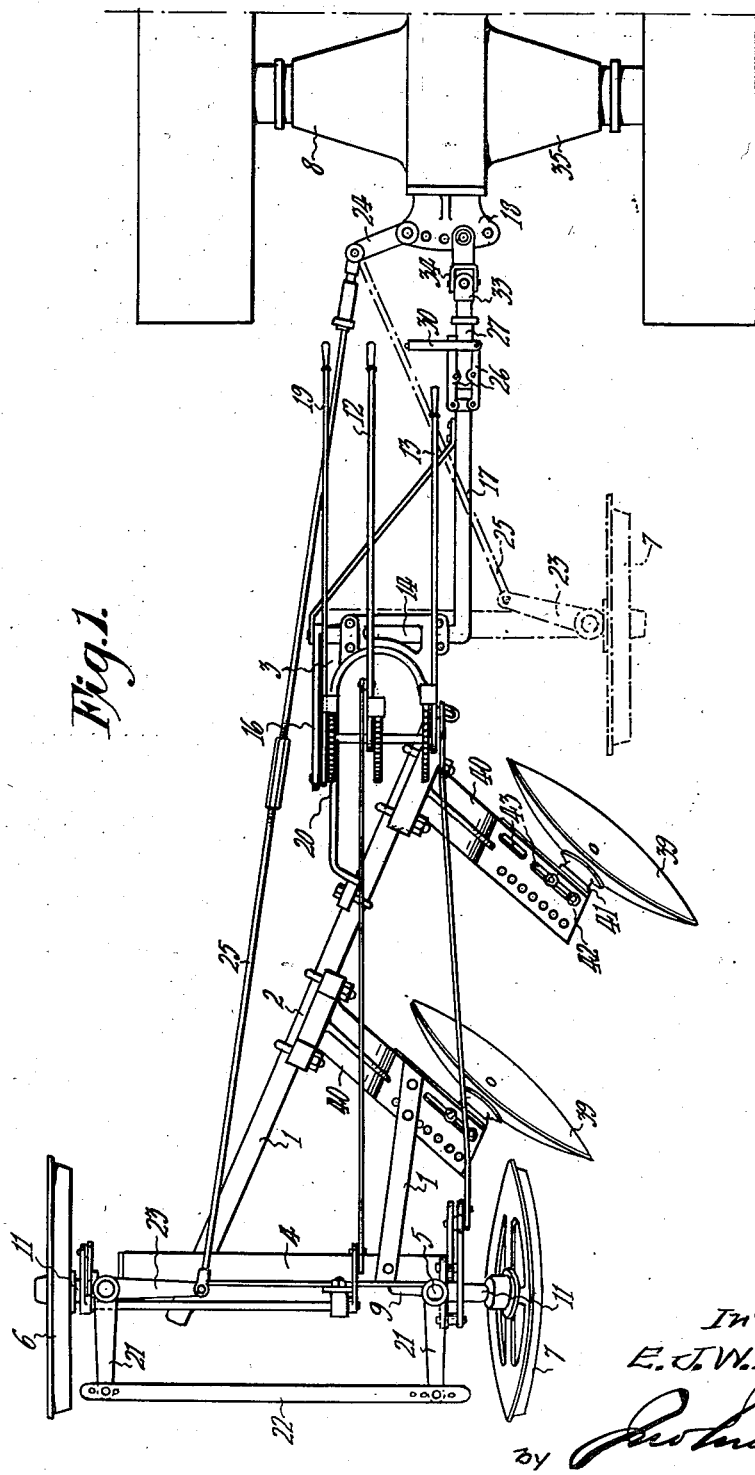

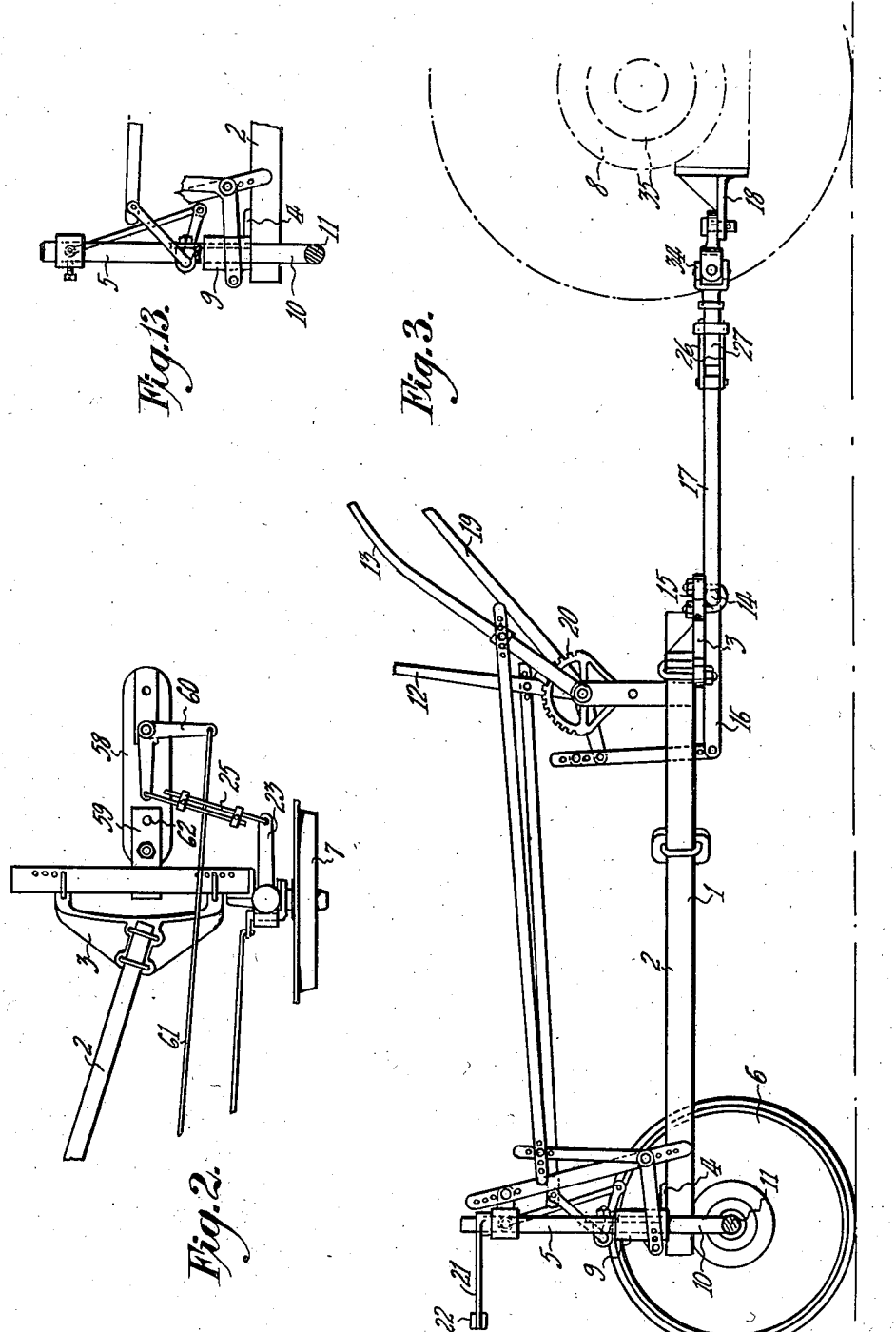

Dec. 22, 1936.  E. J. W. NIELSEN  2,065,015
PLOW
Filed June 27, 1934  4 Sheets-Sheet 4
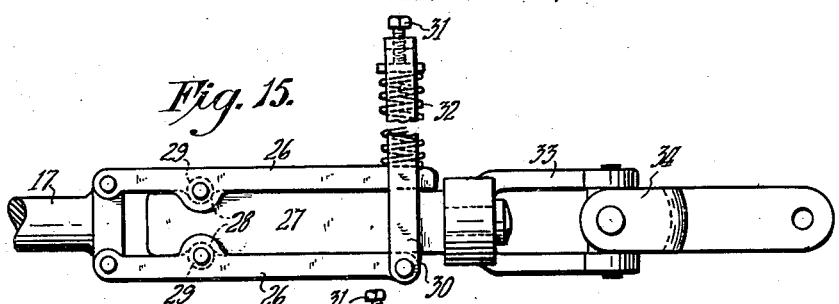
Fig. 15.
Fig. 16.
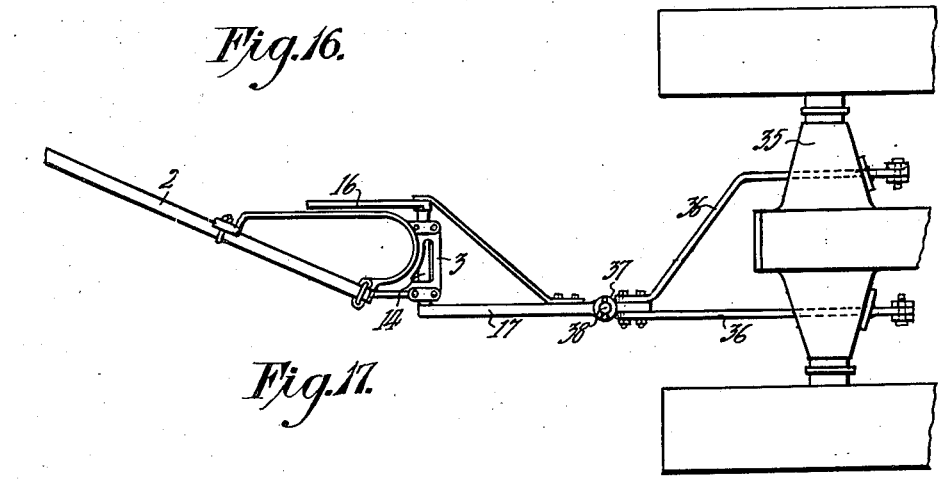
Fig. 17.
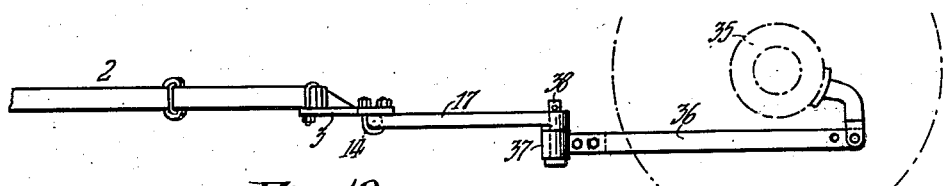
Fig. 18.
Inventor
E. J. W. Nielsen
by [signature] Atty Patented Dec. 22, 1936

2,065,015

UNITED STATES PATENT OFFICE 2,065,015

PLOW

Edward James Westergaard Nielsen, Mackay, Queensland, Australia

Application June 27, 1934, Serial No. 732,708
In Australia July 3, 1933

5 Claims. (Cl. 97—47)

This invention relates to an improved multi-furrow plow of disc or mouldboard type, particularly adaptable for, although not limited to, mechanical traction and characterized by lightness of draught, ease of control, better steering, greater convenience in adjustment and handling, and generally by more efficient operation and improved work.

An object of the invention is to enable much closer coupling of the plow with a tractor, the connection being such that the usual front furrow wheel of the plow may be dispensed with and the front end of the plow may be pivotally supported on the tractor draw bar, the usual land wheel and rear or trailing furrow wheel being retained. The elimination of the front furrow wheel lightens the draught and permits the plow frame or body beam to be made of shorter length, thereby facilitating turning and reducing the extent of unplowed ground at headlands. The elimination of the front furrow wheel, moreover, enables the plow to be moved backwardly by the tractor, and it renders possible rearward movement of the latter in a straight direction or lateral backing thereof on either lock. This backing movement, although very desirable, has hitherto been most difficult of attainment in previously used constructions wherein a front furrow wheel was employed. Furthermore, the elimination of the front furrow wheel is attended with the following advantages: better steering is possible and straighter furrows are plowed, the discs hold better to their work on hillsides and on loose ground; the tendency of the discs to choke is much reduced and the plow is much less liable to tip or roll over on rough ground or steep inclines.

An important object of the invention is to so construct the hitching means or coupling for connecting the plow to the tractor, that the front furrow wheel of the plow may generally be dispensed with. Moreover, the improved coupling is adapted to support the side thrust of the forward plow disc which in plows of usual construction is resisted by the front furrow wheel. Furthermore, the improved coupling ensures that while the tractor is passing over rough and uneven ground, the undulating movements of the front wheels thereof will not be transmitted to the plow.

Articulated suspension members are provided for supporting plowing discs from the frame or beam, the connection of the articulated suspension members with the frame being such that they may be slidably adjusted along and secured to said frame to adjust the spacing of the plowing discs and to fix said discs in spaced positions. The articulated suspension members comprise arms adjustably fixed to the frame and hangers having bearings wherein the discs are rotatably mounted, and means are provided to adjustably secure the hangers to the arms in such a manner that the vertical angle of the discs may be adjusted to vary their undercut and the horizontal angle between said discs and the line of draught may be altered to change the breast. Means are provided for adjustably raising and lowering the frame and therewith the suspension members and the discs, so that the depth of plowing of said discs may be adjusted and in order that they may be raised clear of the ground for travelling.

The invention provides means to prevent bucking or uplifting of the tractor when the plow strikes an obstacle, said means being also adapted to form a support for the front end of the plow when the same is disconnected from the tractor. Furthermore, the invention provides an improved bearing for the plowing discs and an improved wheel adapted for use as a land wheel or as a furrow wheel.

In order that the invention may be better understood reference will now be directed to the accompanying explanatory drawings wherein:—

Fig. 1 is a plan of a tractor plow according to the invention.

Fig. 2 is a plan of portion of a horse-drawn plow according to the invention.

Fig. 3 is a side elevation of lifting mechanism for raising and lowering the plow frame.

Fig. 4 is a side elevation of a disc carrier arm.

Fig. 5 is a section on the line 5—5 in Fig. 4.

Figs. 6, 7 and 8 are detached views of an alternative form of disc carrier arm.

Fig. 9 is a longitudinal section of a disc bearing attached to the disc carrier arm shown in Figs. 4 and 5.

Fig. 10 is an end elevation of the disc bearing shown in Fig. 9.

Fig. 11 is a longitudinal section of an alternative disc bearing attached to the carrier arm shown in Figs. 6, 7 and 8.

Fig. 12 is a side elevation of the alternative disc bearing shown in Fig 11, adjusted to a different angular position.

Fig. 13 is a side elevation of the mounting of the furrow and land wheels of the improved plow.

Fig. 14 is a horizontal section of a plow wheel embodied in the invention.

Fig. 15 is a plan of releasable draught means connecting the plow and the tractor.

Fig. 16 is a similar view to Fig. 15 showing the draught means when released by abnormal strain.

Fig. 17 is a plan of draught means connected to a tractor to prevent uplifting thereof.

Fig. 18 is side elevation of the draught means shown in Fig. 17.

In these views, 1 indicates the main frame of the implement which includes a beam or bar 2 preferably constructed of metal, and disposed in inclined relation to the line of draught. The forward end of the beam 2 is secured to a horizontal bridle 3, while a cross member 4 substantially at right angles to the line of draught is fixed to the rear end of the beam 2.

Supporting members 5 in required positions on the main frame 1 carry respectively a land wheel 6 and a furrow wheel 7 and the supporting member 5 of the latter wheel is pivoted and is connected to the steering mechanism of a tractor 8, so that the steering of the furrow wheel 7 is synchronized with the steering movements of the tractor. Preferably, both the land wheel 6 and the furrow wheel 7 are steerable and their steering movements are synchronized with the steering movements of the tractor 8 as hereinafter described.

Fixed to each end of the rear cross member 4 of the main frame 1 is a bracket 9 or the like in which a mounting 10 carrying a laterally projecting axle 11 is fitted so as to be slidably adjustable in a vertical direction. The projecting axles 11 thus mounted at opposite ends of the rear cross member 5 carry respectively the land wheel 6 and the furrow wheel 7 and the vertically slidable mountings 10 and axles 11 are operatively connected to manually actuated levers 12 and 13 whereby said mountings and axles may be independently adjusted and secured at required heights relatively to the frame 1.

The mountings 10 are, moreover, pivotally adjustable to change the inclination of the axles 11 and of the said furrow and land wheels to the line of draught. Furthermore, said mountings are interlinked and are so connected with the tractor 8 that the steering movements of the latter are communicated to the land wheel 6 and to the furrow wheel 7 in a manner hereinafter described.

A transverse shaft 14 is pivotally mounted in bearings 15 on the said horizontal bridle 3 and the transverse shaft 14 is provided with a rearwardly extending arm 16 and with a forwardly extending arm 17, which arms together with said shaft form a rigid and inflexible structure.

The forwardly extending arm 17 is universally connected to the tractor draw-bar 18 and it forms the draught connection between the tractor and the plow. The forwardly extending arm 17 is rigid in itself and the pivotal connection of the transverse shaft 14 to the bridle 3 is a rigid one in so far as horizontal movement is concerned. Consequently, the forwardly extending arm 17 or draught connection and the main frame 1 are continuous and horizontally inflexible from the tractor draw-bar 18 to the said furrow and land wheels mounted at the rear of the main frame 1 in the manner already described.

The pivotal connection of the said transverse shaft 14 to the bridle 3, however, permits the main frame 1 to be raised and lowered. For the purpose of raising and lowering the main frame 1 and securing it in an adjusted position, the said rearwardly extending arm 16 is link-connected to a manually operated lifting lever 19 which is releasably engageable with a locking rack 20 in well known manner.

The forwardly extending arm 17 or draught connection at its front end is supported by the tractor 8 thereby enabling the usual front furrow wheel to be dispensed with. Moreover, the continuity and horizontal inflexibility of the said draught connection and the main frame 1 enables the steering movements of the tractor 8 to be communicated to the said furrow and land wheels at the rear end of the plow and also to a front furrow wheel when it is indispensable as previously indicated, so that said furrow and land wheels may be synchronously steered to cause the plow to follow and track truly with the tractor.

In order that the furrow and land wheels at the rear of the plow may thus be steered, the said pivotally adjustable mountings 10 carrying said wheels are provided with arms 21 which are linked together by a tie rod 22. One of the said mountings is provided with a radial arm 23 which is connected at its outer end to a fixed arm 24 mounted on the tractor draw-bar 18 or to another convenient fixed part of the tractor 8 by a steering rod or drag link 25.

As the tractor 8 is steered to the right or to the left, the drag link 25 by means of the radial arm 23 causes the interlinked mountings 10 to be appropriately rotated to steer the furrow wheel 7 and the land wheel 6 in the direction in which the tractor 8 is moving.

A front furrow wheel may be used when necessary, and it may be pivotally supported on a mounting provided with an arm connected by a drag link to a fixed arm or part on the tractor 8, said mounting, said arms and drag link being constructed in precisely similar manner to the corresponding parts employed for steering the land wheel 6 and the rear furrow wheel 7 as previously described.

The forwardly extending arm 17 of the transverse shaft 14 instead of being constructed in one piece may be formed as a safety hitch, while the feature of rigidity of said arm may still be maintained.

For the purpose of so forming a safety hitch, the forwardly extending arm 17 may be constructed with two parallel jaws 26 between which a tongue 27 carried by the tractor 8 is adapted to enter when the plow is being hitched thereto. The tongue 27 fits between the jaws 26 so as to form a rigid connection therewith, and said tongue is provided with grooves or recesses 28 with which spring pressed members or rollers 29 carried by the jaws 26 are adapted to engage. The spring pressed rollers 29, by their engagement with the grooves or recesses 28, transmit pull or tension from the tongue 27 to the jaws 26 and thereby apply tractive force to the plow. However, should the plow in its progress encounter excessive resistance, the increased pull or tension will displace the rollers 29 from the grooves 28 in the tongue 27 and the plow will become disconnected.

To enable the rollers 29 to be thus disconnected from the grooves 28, the jaws 26 may be pivoted at one end upon the forwardly extending arm 17. At or near the opposite end of one of the jaws 26 is pivotally secured a bridle or band 30 which extends across and on both sides of the opposed jaw 26 and at its extremity is provided with an adjusting screw 31. A spring 32 is positioned between the screw 31 and the nearer jaw 26, and said spring exerts pressure directly upon said nearer jaw and tension upon the further jaw through the medium of the bridle 30. The spring 32 thus closes the jaws 26 upon the tongue 27 and maintains the rollers 29 in engagement with the grooves 28, until the tractive resistance of the plow is sufficiently increased, as by the same becoming caught on a firm object, to cause the rollers 29 to interact with the grooves 28 to open the jaws 26 in opposition to the spring 32.

The tongue 27 at its end remote from the jaws 26 is adapted to swivel on a longitudinal bar 33, which at its forward end is connected by a universal joint 34 to the tractor draw-bar 18. The tongue 27 is so connected to the longitudinal bar 33 that, while it is adapted to swivel thereon, the former and the latter are rigidly connected together and are incapable of angular displacement.

The longitudinal bar 33, the tongue 27, and said jaws 26 form a rigid inflexible connection or coupling between the plow and the tractor and as the transverse shaft 14 is rigidly secured to the bridle 3 of the main frame 1 as previously described, the coupling and said frame are rigid, continuous and horizontally inflexible at any part from the tractor draw-bar 18 to the said rear furrow and land wheels. The said coupling and the frame 1 can, however, be angularly displaced in a vertical plane by the manually operated lever 19 and locked thereby in an adjusted position as previously described.

The tongue 27 by its releasable connection with the jaws 26 forms a safety hitch, whereby the plow is released when its resistance to motion exceeds a predetermined limit. When the plow is so disconnected from the tractor, it becomes necessary to also disconnect the drag link 25. For the purpose of rendering the drag link 25 disconnectible, said link may be made in two separable portions which may be connected together by a safety hitch of precisely similar construction to the safety hitch described.

To prevent undulating movements of the front wheels of the tractor from being imparted to the front or any other part of the plow, a yoke 36 forming draught means may be pivotally connected to and beneath the rear axle 35. The rear part of the yoke 36 is formed as or provided with a hollow upright sleeve or eye 37 into which is rotatably fitted and secured an upturned pin or journal 38 on the front end of the said forwardly extending arm 17 or said longitudinal bar 33. The upright sleeve 37 and the upturned journal 38 therein form a hinged or pivotal connection between the tractor and the plow which permits of a wide range of lateral angular movement between the plow and the tractor 8 and accordingly permits very short turning to be accomplished.

Plowing discs 39 in required number are supported by carrier arms or frames 40 and hangers 41 adjustably connected to the carrier arms 40. The disc carrier arms 40 project laterally from and are slidably adjustable upon the inclined beam 2 of the plow and they may be clamped to the beam in adjusted positions to set the discs 39 at required distances apart. The undersides of the carrier arms 40 are inclined somewhat to the horizontal from front to rear, their forward edges being set higher than their rearward edges.

The hangers 41 are secured to the carrier arms 40 by strap bolts 42 or the like which are passed through slots 43 in the carrier arms, said slots permitting endwise adjustment of the hangers 41 on the said arms.

For adjusting the angular relationship of the carrier arms 40 and the hangers 41 to vary the setting of the discs 39, there are provided means such as wedges 44 which are inserted between the arms 40 and hangers 41. The adjacent surfaces of said arms and hangers and the opposed faces of the wedges 44 may be suitably grooved or serrated to oppose the twisting tendency and the backward thrust of the discs.

Alternatively, to resist the twisting action of the discs 39, a rib 45 may be provided along the underside of each carrier arm 40 at the forward edge thereof, the said rib being adapted to engage a corresponding groove 46 on the hanger 41. The hanger 41 is also provided at its rear with another groove 47 parallel with the groove 41 and adapted to accommodate a wedge 48 preferably of circular section and of variable diameter which when inserted between the hanger 41 and the carrier arm 40 is adapted to adjust the angular setting of the disc 39 supported by said arm, see Figs. 11 and 12.

In lieu of the wedges 48, setscrews 49 passing through tapped holes 50 and bearing upon the upper surface of the hangers 41 may be used to adjust said hangers to alter the inclination of the discs 39.

The hangers 41 are adapted to form the bearings for the spindle of the discs 39, and they may be made of chilled cast iron in order that they may be highly resistant to wear while being replaceable at low cost. Branching grooves 51 formed in the hangers 41 accommodate the strap bolts 42 in all adjusted positions of said hangers.

The discs 39 are adjusted vertically to set the depth of the furrows, by adjustably raising and lowering the main frame 1 by the manually operated lifting lever 19 and locking rack 20 previously referred to. However, if required, the discs 39 may be raised or lowered independently of the main frame by the provision of means whereby the disc hangers 41 may be adjustably connected to the carrier arms 40 in a vertical direction by a pivotal or slidable connection.

The said land and furrow wheels previously referred to may be of disc form, see Fig. 14, or they may have a projecting hub flange (not shown) from which radiate a plurality of spokes. Bearing bushings 52 and 53 having flanges 54 on their outer ends are fitted in the opposite ends of the hubs 55 of the furrow and land wheels, and bolts 56 passed through aligned holes in the flanges 54 of the bushings 52 and 53 and in the disc portion or hub flange of the said wheels, secure said bushings in the hubs. The outer bushings 53 may be provided with flanged caps 57 through which the said bolts may also extend to retain said caps in position.

Although the invention has been described with special reference to tractor hauled plows, it will be understood that many of its features may be used with advantage on plows drawn by draught animals, thus for example, the articulated disc supports, the improved land and furrow wheels, and the means for automatically steering the front furrow wheel may be incorporated therein.

When the automatic steering means are used on an animal-drawn plow, the rearwardly and forwardly extending arms of the haulage coupling previously described are dispensed with, but the said transverse shaft is retained. The rear end of the draw plate 58 is slidably mounted upon the transverse shaft 14 by a clevis 59 to which said draw plate is pivotally connected. A bell crank lever 60 is mounted upon the draw plate 58 of the plow and one of its arms is linked to an arm 21 on the pivotally rotatable mounting 10 of the furrow wheel 7, the other arm of said bell crank lever being fixed as by connection to hand steering means 61. Angular turning movements of the draw plate 58 are by this means transmitted to the furrow wheel 7 which is steered to follow the direction of the team. When hand steering is required the draw plate 58 is locked to the clevis 59 as by a pin 62, and the bell crank lever 60 is operated by the hand steering means 61.

What I do claim is:—

1. An improved tractor plow comprising, a frame, a beam in the frame inclined to the line of draught, suspension members slidable upon and adjustably connectible with the beam, plowing elements on the suspension members, furrow and land wheels at the rear end of the frame, steering mountings adjustably supported on the frame and carrying the furrow and land wheels, means for adjusting the elevations of the steering mountings, a bridle at the front end of said frame, a transverse shaft pivoted on the bridle and secured thereon at right angles to the line of draught, a forwardly extended rigid arm on the transverse shaft adapted for universal connection with a tractor, a rearwardly extended arm on said transverse shaft adapted to be associated with lifting means for raising and lowering the frame and the plowing elements, and a drag link connecting the steering mountings to a point on the tractor offset from the line of draught.

2. An improved tractor plow according to claim 1, having a front furrow wheel, a steering mounting carrying the front furrow wheel, and a link connecting the steering mounting to a point on the tractor offset from the line of draught.

3. An improved tractor plow as claimed in claim 1, wherein the plowing elements consist of discs and the suspension members comprise carrier arms and hangers adapted to be adjustably clamped to the carrier arms and to form bearings for the spindles of the discs, and wherein the carrier arms are adjustable on the beam to determine the spacing of the furrows and wedges are inserted between the hangers and the carrier arms to adjust the undercut of the discs.

4. In a plow of the character described, disc suspension means comprising, a carrier arm adapted to be adjustably clamped to the beam, longitudinal slots in the carrier arm, a disc hanger hanger forming a bearing for a disc spindle and secured to the underside of the carrier arm by a strap bolt passing through the longitudinal slots, serrations on the underside of the carrier arm and on the upper side of the disc hanger, and a serrated wedge adapted to be inserted between the underside of the carrier arm and the upper side of the hanger.

5. In a plow of the character described, disc suspension means comprising, a carrier arm adapted to be adjustably clamped to the beam, longitudinal slots in the carrier arm, a disc hanger forming a bearing for a disc spindle and secured to the underside of the carrier arm by a strap bolt passing through the longitudinal slots, a rib formed on the underside of the carrier arm at the front edge thereof, a groove in the front portion of the upper surface of the hanger to accommodate said rib, and a groove in the rear portion of said upper surface to accommodate a wedge between the carrier arm and the hanger.

EDWARD JAMES WESTERGAARD NIELSEN.